C. T. BANGS.
POPPET VALVE.
APPLICATION FILED MAR. 8, 1920.
1,414,495.
Patented May 2, 1922.
3 SHEETS—SHEET 2.
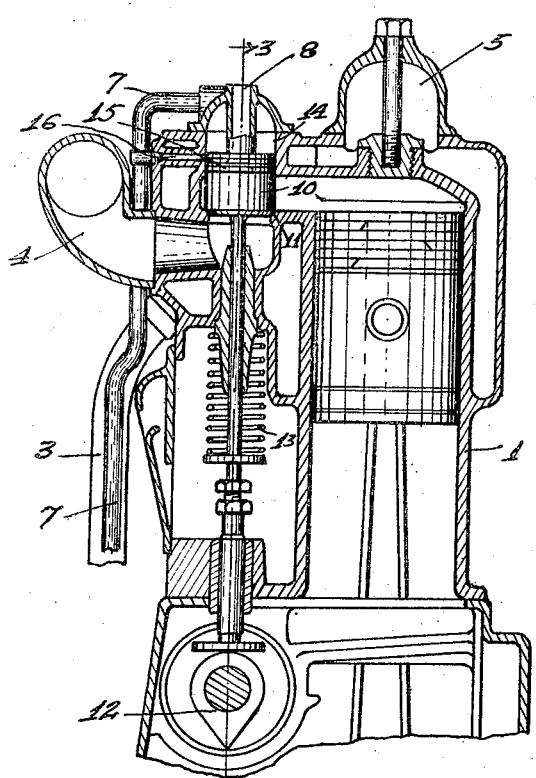
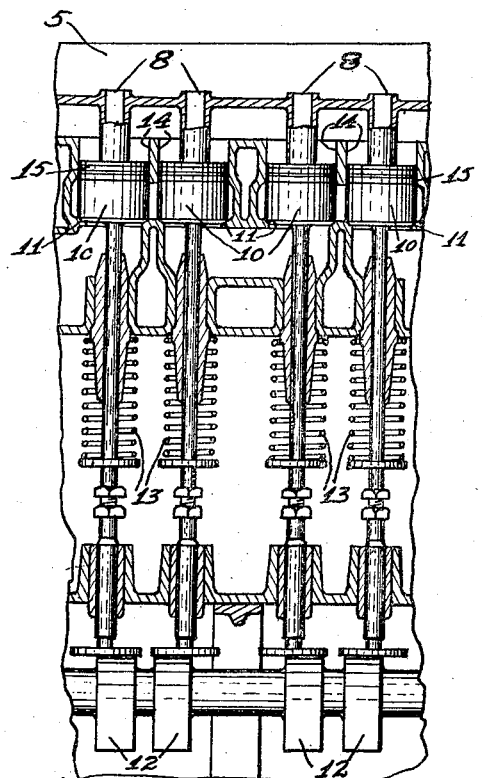
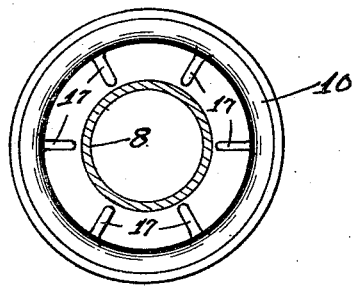
Witnesses
Rudolph J. Berg.
Charles W. Tillage.
Inventor
CHESTER T. BANGS.
By Charles W. Tiller Atty.

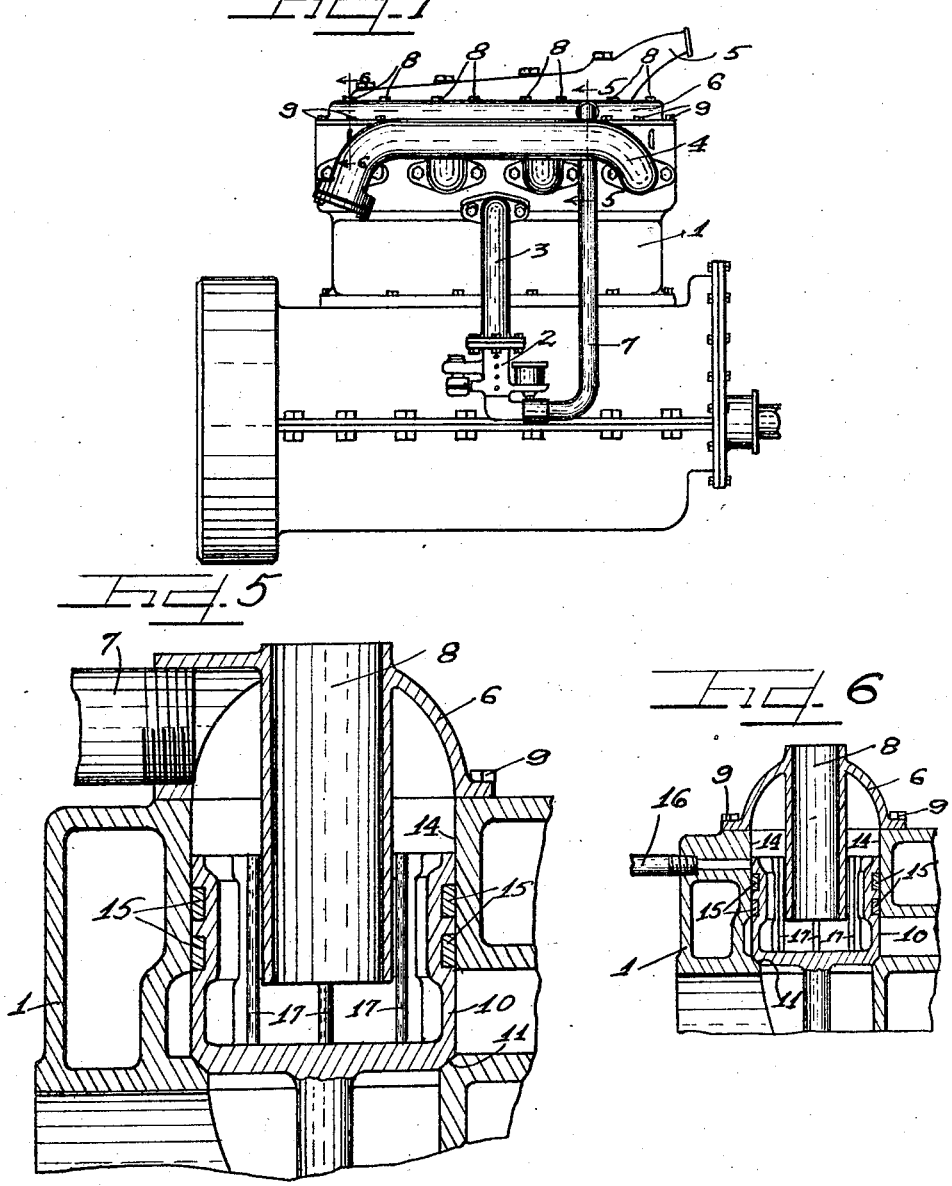

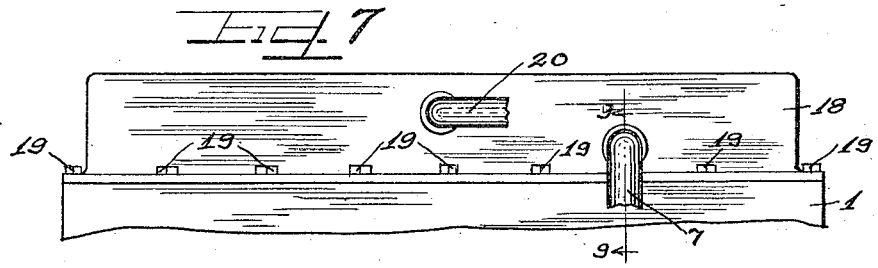
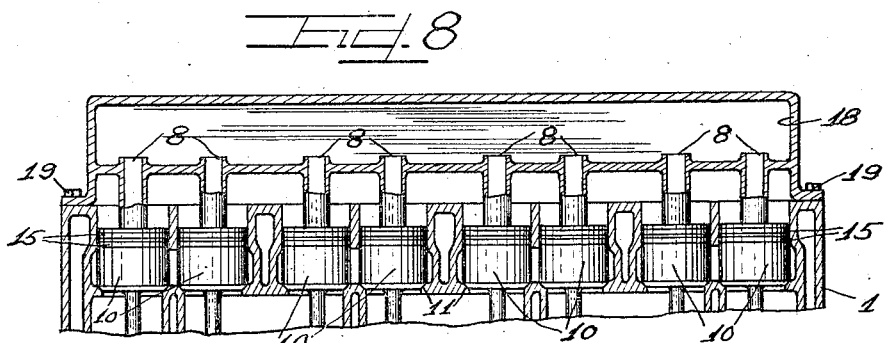
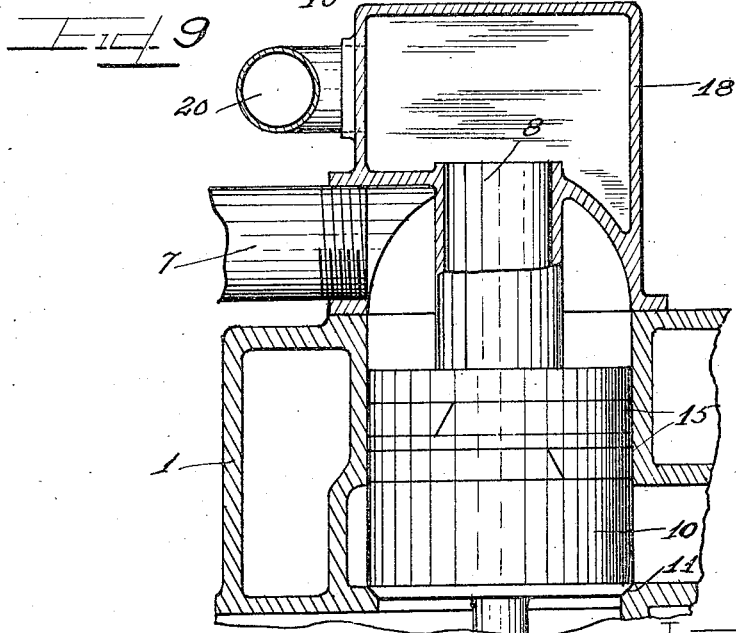

UNITED STATES PATENT OFFICE.

CHESTER T. BANGS, OF CHICAGO, ILLINOIS.

REISSUED

POPPET VALVE.

1,414,495.     Specification of Letters Patent.     Patented May 2, 1922.

Application filed March 8, 1920. Serial No. 364,088.

*To all whom it may concern:*

Be it known that I, CHESTER T. BANGS, a citizen of the United States, and a resident of the city of Chicago, in the county of Cook and State of Illinois, have invented certain new and useful Improvements in Poppet Valves; and I do hereby declare that the following is a full, clear, and exact description of the same, reference being had to the accompanying drawings, and to the numerals of reference marked thereon, which form a part of this specification.

This invention relates to an improved form of construction for poppet valves as used in internal-combustion engines. Great difficulty has heretofore been experienced with the carbonization of poppet valves. This is particularly true of the exhaust valves; because after a considerable amount of the carbonaceous products of combustion have been deposited on and around said valves, the heat of the engine causes said carbon deposits to become incandescent, thus causing preignition in the engine and also causing warping, pitting, and breaking of the valves. This means caking and adherence of the carbon deposits to the valves, and is in a large measure due to the fact that they are subjected to a high heat from the valve itself. The tops of the poppet valves in the ordinary types of internal-combustion engines are ordinarily directly in communication with the hot gases of combustion, and are insufficiently cooled by the water jackets which are commonly provided. It is particularly desirable, in order to prevent the detrimental effects of over heating, to provide some means of cooling the valves.

It is an object of this invention to provide an air-cooled poppet valve for internal-combustion engines.

It is also an object of this invention to provide a hollow valve for internal-combustion engines having the interior thereof specially designed to radiate heat.

It is a further object of this invention to provide a valve construction for internal-combustion engines having means associated therewith for circulating cooling air around the valves of said engine.

It is another object of this invention to provide an air-circulating system for cooling the valves of an internal-combustion engine wherein cooling air is drawn over the surface of the valves and the heated air leaving the valves is conducted to the air intake of the carbureter of said internal-combustion engine.

It is another object of this invention to provide a system for cooling the valves of the internal-combustion engine wherein cooling fluid is circulated over said valves, the rate of circulation of said cooling fluid being dependent upon the speed of the engine.

It is an important object of this invention to provide a valve construction for internal combustion engines wherein the tops of the valves are always in communication with a cooling fluid.

Other and further important objects of this invention will be apparent from the disclosures of the drawings and specification.

The invention (in a preferred form) is illustrated in the drawings and hereinafter more fully described.

On the drawings

Fig. 1 is a view in elevation of an internal-combustion engine equipped with the valve-cooling arrangement of this invention.

Fig. 2 is a fragmentary transverse section taken through Fig. 1.

Fig. 3 is a fragmentary section on line 3—3 of Fig. 2, with parts shown in elevation.

Fig. 4 is a top plan view of one of the valves embodying the principles of this invention, showing the air intake therefor in section.

Fig. 5 is a section on line 5—5 of Fig. 1.

Fig. 6 is a section on line 6—6 of Fig. 1.

Fig. 7 is a fragmentary view in elevation showing the manifold used in a modified form of valve construction embodying the principles of this invention.

Fig. 8 is a longitudinal section taken through Fig. 7 showing the valve construction.

Fig. 9 is a section on line 9—9 of Fig. 7.

As shown on the drawings:

The valve construction embodying the principles of this invention is adapted to be used on an internal-combustion engine 1. Since the internal-combustion engine does not form a part of this invention, it will be herein described only so far as it relates to the valve construction of this invention and cooperates with the operation thereof. Said engine 1 is provided with a carbureter 2, and intake manifold 3 leading therefrom, and an exhaust manifold 4 which carries the burnt gases away from the engine. A waterjacket 5 is also provided for circulating cooling water around the cylinders of the engine 1.

The valve construction of this invention is enclosed by manifold 6 which is secured to the top of the cylinder block of the internal-combustion engine 1 and which is connected with the air intake of the carbureter 2 by warm air pipe 7. The manifold 6 is ordinarily removably secured to the top of the cylinder block by bolts 9 or may be clamped thereon if desired. A gasket may be placed between said manifold 6 and the top of the cylinder block. Cool air inlets 8 are formed in the manifold 6 and said cool air inlets correspond in number and are coaxial with the valves of the engine 1. Positioned below the cool air inlets are the valves 10 which are constructed according to the principles of this invention. Said valves 10 are adapted to seat in seats 11 formed in separate passages of the usual construction leading to the inlet manifold 3 and the exhaust manifold 4 of the engine 1, and are operated by cams 12 and springs 13 in the usual and well-known manner. Said valves 10 are constructed similar to a hollow piston and are slidable in cylinders 14 formed in the cylinder block of the engine 1 directly below the cool air inlet 8. A sealing fit between the valve 10 and the walls of the cylinder 14 is assured by means of piston rings 15 which are engaged in grooves in the upper portion of said valves. Lubrication of the walls of the cylinders 14 is provided by tubes 16 which lead from the oil pump and oil supply of the engine to the walls of said cylinder 1. To provide for cooling the interior of the valves 10, radiating fins 17 are formed integrally therein as clearly shown in Figs. 4 and 5.

In the modified form of construction shown in Figs. 7, 8, and 9 the cooling air is admitted to the cool air inlet 8 through a manifold 18 which is integrally formed thereover. Said manifold 18 and cool air inlet 8 are removably secured to the cylinder head of the internal-combustion engine 1 by bolts 19, or may be clamped thereon if desired. The heated air from the valve is conveyed to the intake of the carbureter 2 by the pipe 7 as heretofore described.

The operation is as follows:

The construction of this invention is particularly designed to provide means whereby cooling air may be circulated over the top of the valves of an internal-combustion engine. The cooling air enters through the air inlets 8 to the interior of the valve 10. As the air becomes heated by the valve, it rises and is drawn into the intake of the carbureter and through the pipe 7. Thus, when the engine is running there is a constant circulation of air entering through the cool air inlets 8 and drawn out through the pipe 7 into the intake of the carbureter 2. The amount of air circulation of course depends upon the suction of the carbureter 2 which is in turn dependent upon the speed of the engine. Therefore, the amount of cooling air circulated inside of the valve 10 depends upon the speed of the engine, and there is no danger of the valve becoming overheated at high engine speeds.

In the modified form of construction shown in Figs. 7, 8, and 9 the cooling air is first passed through a suitable air washer or screen, and is introduced into the manifold 18 through the pipe 20 leading from said washing or screening device. With this arrangement clean air always enters through the cooling air inlet 8 and clean heated air is always introduced into the carbureter 2. This arrangement does away with clogging of the carbureter and subsequent fouling of the engine due to impure air. With the construction of this invention, deposits of carbon on the valves and the seats thereof are greatly minimized due to the fact that said valves and seats do not become heated enough to cake the carbon thereon. Carbon that is deposited on the valves, not being heated and caked, is easily blown out and the valves of the engine are readily kept clean and tight. Danger of pre-ignition from incandescent carbon is eliminated to a great degree by the superior cooling means of this invention. Warping and breaking of the valves is also done away with, and the efficiency of the motor is greatly increased. The efficiency of the carbureter is also increased because warm air is always supplied thereto. Of course, means may be provided in the pipe 7 whereby a certain amount of cool air may be admitted to the intake of the carbureter, if necessary.

While means have been shown and described whereby the heated air is taken from the manifold by the suction of the carbureter, it is not purposed to limit this invention thereto. A fan or other air circulating mechanism may be connected to the pipe 7 and used for circulating cooling fluid over the valves.

I am aware that numerous details of construction may be varied through a wide range without departing from the principles of this invention, and I therefore do not purpose limiting the patent granted otherwise than necessitated by the prior art.

I claim as my invention—

1. In an internal combustion engine, a poppet valve, a hollow cylinder integral therewith, an engine block having a cylindrical way in which said cylinder slides, a tube mounted on the engine block, open to the atmosphere, extending into the interior of said hollow cylinder and concentric therewith, and longitudinal fins on the interior surface of said cylinder extending radially nearly to said tube.

2. In an internal combustion engine, a poppet valve, a hollow cylinder integral therewith, an engine block having a cylindrical way in which said cylinder slides, a tube mounted on the engine block, open to the atmosphere, extending into the interior of said hollow cylinder nearly to the position of the outer surface of said valve when lifted farthest from its seat and concentric therewith, and longitudinal fins on the interior surface of said cylinder extending radially nearly to said tube.

3. In an internal combustion engine, a series of poppet valves, hollow cylinders one integral with each valve, an engine block having a series of ways in which said cylinders slide, a manifold secured to said engine block, a series of tubes mounted in said manifold, open to the atmosphere and each extending into the interior of one of said cylinders and concentric therewith, longitudinal fins on the interior of each cylinder extending radially nearly into contact with said tube, and means for withdrawing air from said manifold.

4. In an internal combustion engine, a poppet valve, a hollow cylinder integral therewith, an engine block having a cylindrical way in which said cylinder slides, a tube mounted on the engine block, open to the atmosphere, extending into the interior of said hollow cylinder and concentric therewith, longitudinal fins on the interior surface of said cylinder extending radially nearly to said tube, and means for maintaining a current of air through said tube.

5. In an internal combustion engine, a valve chest, inlet valves therein, a conduit for each of said valves, leading from outside the valve chest to the face of its valve opposite the seat thereof, and a conduit from said valve chest to the carbureter, whereby the inlet valves are cooled by a stream of air and warm air is introduced into the carbureter.

In testimony whereof I have hereunto subscribed my name in the presence of two subscribing witnesses.

CHESTER T. BANGS.

Witnesses:
LAWRENCE REIBSTEIN,
CARLTON HILL.